United States Patent
Casale

(10) Patent No.: US 9,437,983 B2
(45) Date of Patent: Sep. 6, 2016

(54) ELECTRICAL CONNECTION BOX

(71) Applicant: Joseph Casale, Cary, NC (US)

(72) Inventor: Joseph Casale, Cary, NC (US)

(73) Assignee: Progressive Industries, Inc., Apex, NC (US)

(*) Notice: Subject to any disclaimer, the term of this patent is extended or adjusted under 35 U.S.C. 154(b) by 41 days.

(21) Appl. No.: 14/605,575

(22) Filed: Jan. 26, 2015

(65) Prior Publication Data

US 2016/0218468 A1    Jul. 28, 2016

(51) Int. Cl.
*H01R 13/66* (2006.01)
*H01R 27/02* (2006.01)
*H01R 13/52* (2006.01)
*H01R 13/533* (2006.01)

(52) U.S. Cl.
CPC ...... *H01R 13/6666* (2013.01); *H01R 13/5205* (2013.01); *H01R 13/533* (2013.01); *H01R 27/02* (2013.01)

(58) Field of Classification Search
CPC .......... H01R 13/5205; H01R 13/5221; H01R 13/645; H01R 13/6453; H01R 29/00; H01R 33/965; H01R 13/6395; H01R 24/525; H01R 25/006; H02G 3/16
USPC ............. 439/540.1, 166, 173–175, 177, 956, 439/271, 273–275, 587, 604, 535; 174/59
See application file for complete search history.

(56) References Cited

U.S. PATENT DOCUMENTS

| 2,433,917 | A  | * | 1/1948  | McCartney | H01R 25/006 174/50 |
| 2,828,394 | A  | * | 3/1958  | Mayzik    | H02B 1/056 174/55 |
| 5,577,923 | A  | * | 11/1996 | Lee       | H01R 13/64 439/170 |
| 6,737,584 | B2 | * | 5/2004  | Kiely     | H02G 3/0691 16/2.2 |
| 8,585,444 | B2 | * | 11/2013 | Chang     | H01R 13/627 439/131 |
| 8,686,683 | B2 | * | 4/2014  | Caskey    | H01R 13/6675 320/107 |
| 2013/0109219 | A1 | * | 5/2013 | Liao      | H01R 13/743 439/345 |

* cited by examiner

*Primary Examiner* — Neil Abrams
*Assistant Examiner* — Travis Chambers
(74) *Attorney, Agent, or Firm* — David P. Hendricks

(57) ABSTRACT

Electrical connection boxes for use in recreational vehicle and marine applications must be adapted for a variety of electrical services and electrical connection styles. In order to standardize electrical connection boxes for these uses, a plurality of positioning tabs may be mounted within the connection box to accommodate electrical connection receptacles of various sizes. Unused positioning tabs may be removed during assembly. Further standardization can be achieved through the use of gaskets adapted for use with power cords of different sizes but having common design features to mate with a common seating surface design.

18 Claims, 9 Drawing Sheets

ELECTRICAL CONNECTION BOX

FIELD OF THE INVENTION

The present invention is directed generally to electrical devices, and more specifically to electrical connection boxes adapted for use with a variety of sizes of recepticles.

BACKGROUND

Recreational vehicles (RVs) and boats are mobile vehicles that may periodically require connection to an outside power source. For example, many people who travel in RVs will stop overnight at a campground. The campground often provides an electrical panel with one or more electrical connection receptacles to the owner of the RV as part of the services provided for the owner's stay. The electrical panel may provide several different electrical services, ranging from 120 volt and 15 amps up to 240 volt and 50 amps.

The owner of the RV may take an extension electrical cord that is connected or otherwise tied in to the RV's electrical system and plug the extension cord into the campground's electrical panel. While this appears straightforward, many problems may be encountered. For example, the RV may be designed to connect to a different electrical service than that provided by the campground. The RV owner must also be aware of the amperage draw of the electric devices in the RV and determine whether the campground's electric service is adequate.

Perhaps a more compelling problem is the quality of the electric service provided by the campground. The campground's electric system may be old and in need of repair, or repairs may have been made that were insufficient or simply done wrong. Additionally, the campground's electrical system and connection points may have been subjected to abuse by previous RV owners, or may be degrading due to outside weather exposure. All of these factors may contribute to surges in the electricity supply, voltage spikes, open common or ground lines, or reversed polarity to name just a few potential problems.

Boats moored at a marina face similar problems. Aging boats are notorious for having suspect electrical systems. Further compounding marine electrical problems is that the electrical system is installed over or in a water environment that is ripe with the possibility of open shorts directly to the water. A single boat with a bad electrical system has been known to cause severe damage to many nearby boats connected to the same marina electrical system.

The RV and boat owner may connect one or more protective devices between the RV's or boat's electrical system and the outside electrical system to protect the vehicle's electrical system from poor quality outside electrical service. While surge protectors and voltage spike conditioners are found in several fields dealing with electric service, devices for RV and boat use must accommodate a range of connector types and electric service types, which makes fabricating these devices in a cost effective manner a challenging endeavor.

BRIEF SUMMARY OF THE INVENTION

The present disclosure may be directed to an electrical connection box. An exemplary electrical connection box may comprise a front section and a back section forming a hollow space therebetween. The front section may have an outer surface and a mounting hole in the outer surface, and the back section may have an inner surface. The exemplary electrical connection box may further comprise an electrical connection receptacle having a front face and a first length or a second length, and the electrical connection receptacle may be positioned within the mounting hole. A portion of the electrical connection receptacle may extend into the hollow space forming a gap between the electrical connection receptacle and the back section inner surface. A portion of the electrical connection receptacle may extend out of the mounting hole such that the front face of the electrical connection receptacle is positioned a predetermined distance above the front section outer surface. A first set of positioning tabs may extend outward from the back section inner surface across the gap and may contact the electrical connection receptacle thereby maintaining the predetermined distance when the electrical connection receptacle has a length equal to the first length. A second set of positioning tabs may extend outward from the back section inner surface across the gap and may contacting the electrical connection receptacle thereby maintaining the predetermined distance when the electrical connection receptacle has a length equal to the second length.

According to additional exemplary embodiments, the present disclosure may be directed to an electrical connection box. An exemplary electrical connection box may comprise a power cord receiver extending outward from the connection box and forming an opening into the connection box, the opening further comprising first and second seating surfaces. A power cord may be positioned within the power cord receiver and may extend through the opening into the electrical connection box. The exemplary electrical connection box may further comprise a locking nut having a third seating surface, the locking nut engaging the power cord receiver. A gasket may be disposed about the power cord and may be positioned at least partially within the opening. The gasket may comprise at least three interconnected surfaces, at least two of the interconnected surfaces in contact with the power cord receiver and at least one of the interconnected surfaces in contact with the locking nut. The gasket may further comprise a fourth surface in contact with the power cord.

According to still further exemplary embodiments, the present disclosure may be directed to an electrical connection box. An exemplary electrical connection box may comprise a power cord receiver extending outward from the connection box and forming an opening into the connection box. The opening may further comprise first and second seating surfaces. A power cord may be positioned within the power cord receiver and may extend through the opening into the electrical connection box. A gasket may be disposed about the power cord and may be positioned at least partially within the opening, the gasket having first, second, and third side surfaces. The first side surface and the second side surface may be oriented relative to one another by a first angle, and the third side surface and the second side surface may be oriented relative to one another by a second angle. The exemplary electrical connection box may further comprise a locking nut having a third seating surface. The locking nut may engage the power cord receiver. The third seating surface may contact the gasket third side surface when the locking nut engages the power cord receiver, thereby urging the gasket first side surface into contact with the first seating surface and urging the gasket second side surface into contact with the second seating surface.

DETAILED DESCRIPTION

The present application is directed to electrical connection boxes. According to certain embodiments, the electrical connection box may comprise a front section and a back section forming a hollow space therebetween. The front surface may have an outer surface and a mounting hole in the outer surface, and the back section may have an inner surface. The electrical connection box may further comprise an electrical connection receptacle having a front face and a first length or a second length, the electrical connection receptacle positioned within the mounting hole. A portion of the electrical connection receptacle may extend into the hollow space forming a gap between the electrical connection receptacle and the back section inner surface. A portion of the electrical connection receptacle may extend out of the mounting hole such that the front face of the electrical connection receptacle is positioned a predetermined distance above the front section outer surface. A first set of positioning tabs may extend outward from the back section inner surface across the gap and contact the electrical connection receptacle thereby maintaining the predetermined distance when the electrical connection receptacle has a length equal to the first length. A second set of positioning tabs may extend outward from the back section inner surface across the gap and contact the electrical connection receptacle thereby maintaining the predetermined distance when the electrical connection receptacle has a length equal to the second length.

Additional embodiments may comprise an electrical connection box having a power cord receiver extending outward from the connection box and forming an opening into the connection box. The opening may further comprise first and second seating surfaces. A power cord may be positioned within the power cord receiver and extend through the opening into the electrical connection box. A gasket may be disposed about the power cord and may be positioned within the opening, the gasket having first, second, and third side surfaces. The first side surface and the second side surface may be oriented relative to one another by a first angle, and the third side surface and the second side surface may be oriented relative to one another by a second angle. The electrical connection box may further comprise a locking nut having a third seating surface, the locking nut engaging the power cord receiver. The third seating surface may contact the gasket third side surface when the locking nut engages the power cord receiver, thereby urging the gasket first side surface into contact with the first seating surface and urging the gasket second side surface into contact with the second seating surface.

Figure 1:
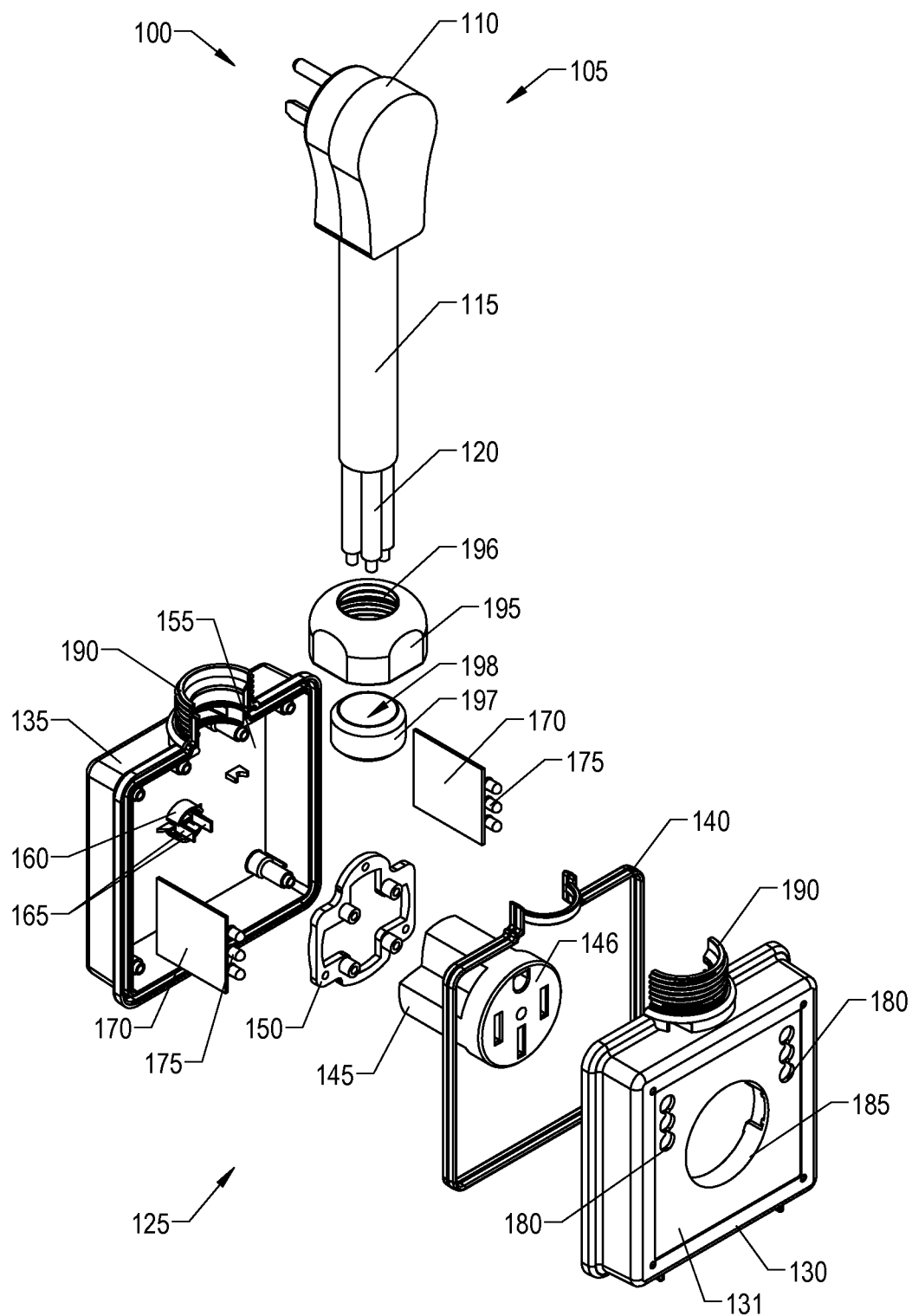
FIG. 1 is an exploded perspective view of an electrical surge suppressor system for an exemplary 4-wire 50 amp, 240 volt electrical system.
Figure 2:
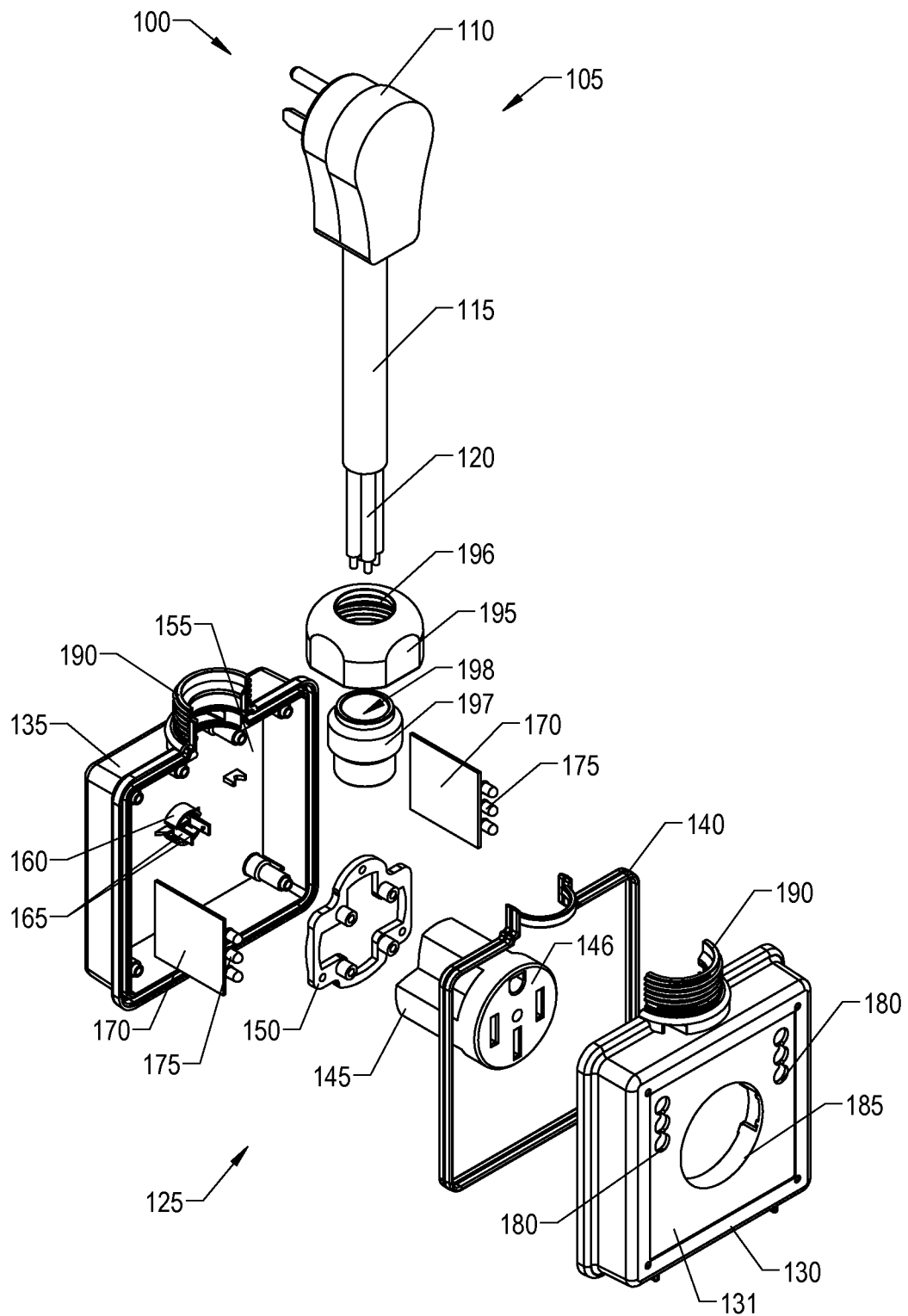
FIG. 2 is an exploded perspective view of an electrical surge suppressor system or an exemplary 4-wire 30 amp, 240 volt electrical system.
Figure 3:
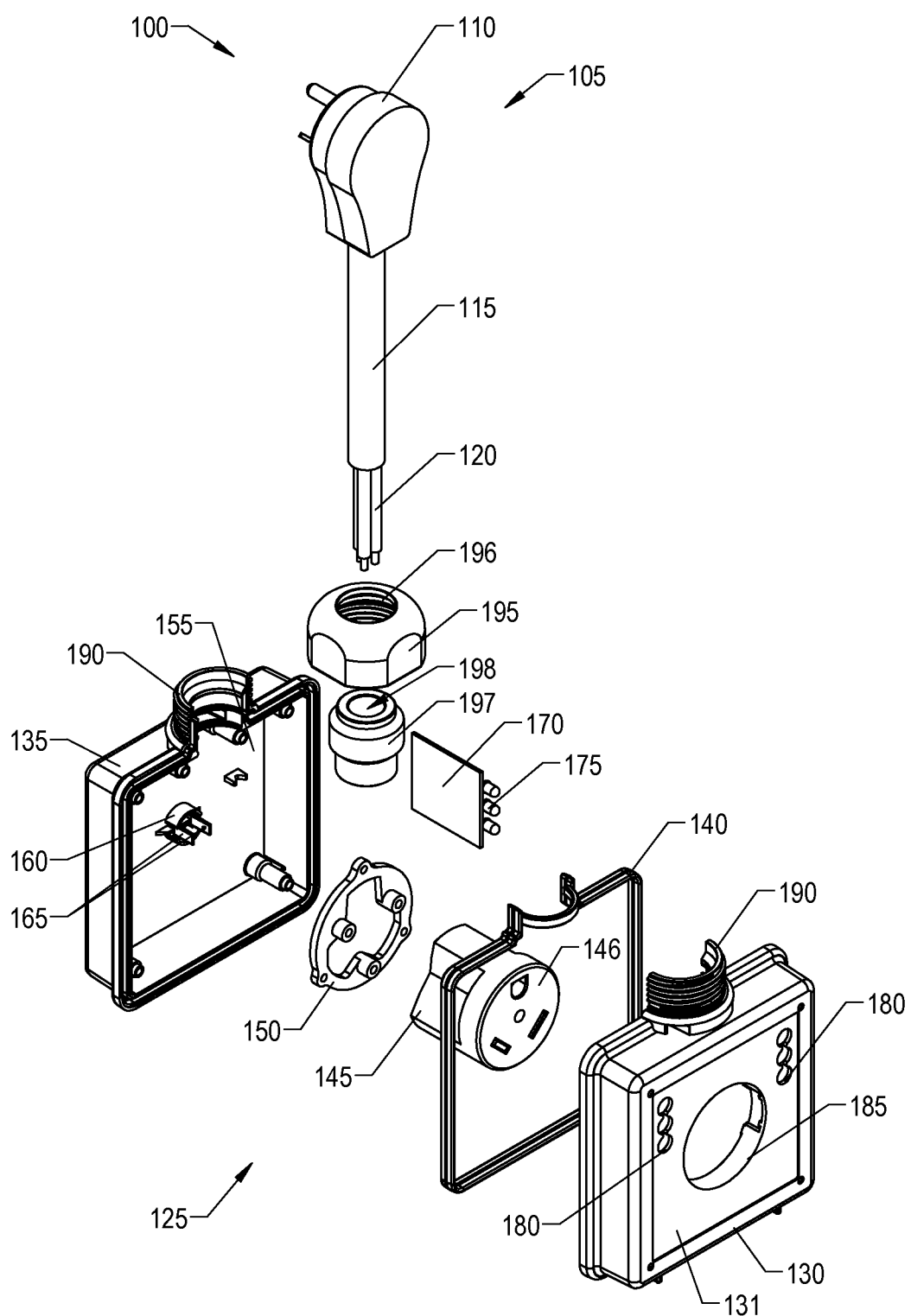
FIG. 3 is an exploded perspective view of an electrical surge suppressor system for an exemplary 3-wire 20 amp, 120 volt electrical system.

Various embodiments may comprise an electrical surge suppressor system 100 as illustrated in FIGS. 1 through 3. The electrical surge suppressor system 100 may comprise an input power plug assembly 105 and a connection box assembly 125. The input power plug assembly 105 may connect to an input power source (not shown) such as a campground or marina electrical pedestal. These pedestals may have a variety of power sources available, such as 50 amp, 30 amp and 20 amp. Proper selection of the type of input power plug assembly 105 may be required to match the available power source. For example, FIGS. 1 and 2 illustrate input power plug assemblies 105 for 50 amp and 30 amp, respectively, input power sources. Typically, these 50 amp and 30 amp input power sources are designed as 4-wire 240 volt electrical systems (two 120 volt hot, one common, and one ground), and the input power plug assembly 105 also comprises four internal wires 120 which are in turn enclosed within a power cord jacket 115. In contrast, FIG. 3 illustrates an input power plug assembly for a 3-wire 120 volt electrical system (one 120 volt hot, one common, and one ground) that may have a 20 amp capacity. In addition, the input power source may have a specific type of receptacle (to receive the input power plug assembly 105) for each amperage service. For example, 50 and 30 amp service may be supplied using a receptacle comprising three prongs (in addition to a ground) arranged in a certain pattern. The input power plug assembly 105 may further comprise an input male plug 110 corresponding to the input power source receptacle.

The connection box assembly 125 may comprise a front section 130 and a back section 135 that may be coupled together to form a generally hollow box. A gasket 140 may be disposed between the front section 130 and the back section 135 where the sections 130, 135 meet to seal the connection box assembly 125 from water and dirt intrusion in outdoor environments. Positioned at least partially within the hollow space formed by the front section 130 and back section 135, there may be an outlet female receptacle 145 and one or more power monitoring devices 170. The outlet female receptacle 145 may be coupled to the front section 130 by a mounting bracket 150. When the outlet female receptacle 145 is coupled to the front section 130, a front face 146 of the outlet female receptacle 145 may be positioned within a mounting hole 185 in the front section 130 such that a user may have ready access to the outlet female receptacle 145. The front face 146 of the outlet female receptacle 145 may be positioned flush with an outer surface 131 of the front section 130, or the front face 146 may extend slightly beyond the outer surface 131 (see FIGS. 13 and 14 for further detail). The internal wires 120 of the input power plug assembly 105 may be coupled to the receptacle 145.

The power monitoring devices 170 may comprise electronic devices and associated circuitry (such as printed circuit boards and hard wiring) to monitor the input power source for surges, voltage fluctuations, reverse polarity, open neutral (or common), open ground, and the like. The power monitoring devices 170 may further comprise a plurality of indicator lights 175 positioned within mounting holes 180 in the front section 130. The indicator lights 175 may inform the user of the condition of the input power supply and the operation of the electrical surge suppressor system 100 as a whole. The power monitoring devices 170 may disrupt a connection between the input power plug assembly 105 and the outlet female receptacle 145 if certain conditions are detected. These detected conditions may comprise, for example, a surge exceeding a predetermined amperage, a voltage fluctuation exceeding a predetermined amount, reversed polarity, or open circuits. The plurality of indicator lights 175 may be lit in a certain pattern or sequence (such as lighting or alternately flashing a predetermined subset of the plurality of indicator lights 175) to indicate various conditions to the user. For example, FIG. 1 illustrates an embodiment comprising six indicator lights 175 which may be numbered 1 through 6 (not shown). If indicator light #1 is lit, proper operation may be indicated. If instead, for example, lights #1 and #3 are lit (or, for example, alternately flashing), a surge suppressor activation may be indicated. One skilled in the art will recognize that any desired pattern of lit indicator lights 175 or number of lit indicator lights 175 may be used in a variety of embodiments without straying from the scope of this disclosure.

Each of the front section 130 and the back section 135 of the connection box assembly 125 may additionally comprise a portion of power cord receiver 190. When the front section 130 and the back section 135 are coupled together, the portions of the power cord receiver 190 may join together to form a complete power cord receiver 190, thereby forming a power cord receiver opening 210 therebetween (see FIGS. 4, 7, and 10). The input power plug assembly 105 may be positioned at least partially within the power cord receiver opening 210 such that ends of the power cord internal wires 120 are positioned within the hollow space of the connection box assembly 125 for coupling to the outlet female receptacle 145. The input power plug assembly 105 may further pass through a locking nut 195 and gasket 197. The locking nut 195 and gasket 197 may couple the input power plug assembly 105 to the connection box assembly 125 as described in detail below. The gasket 197 may comprise an elastomeric material to facilitate a waterproof seal.

As mentioned in the discussion above in relation to FIGS. 1 through 3, there are a variety of different input power plug assemblies 105 that may be used in various embodiments. Custom designing front and back sections 130, 135 of the connection box assembly 125 with input power cord receivers 190 sized for each possible input power plug assembly would significantly increase manufacturing costs in a number of ways as compared to standardizing these components. For example, tooling would have to be created for each component which would result in substantial capital cost outlay; fewer pieces of each component would be ordered, increasing per unit costs; and a greater number of components would have to be maintained in inventory, which increases operating costs. Therefore, various embodiments include design features to allow significant standardization of components regardless of the specific input power plug assembly 105.

Figure 6:
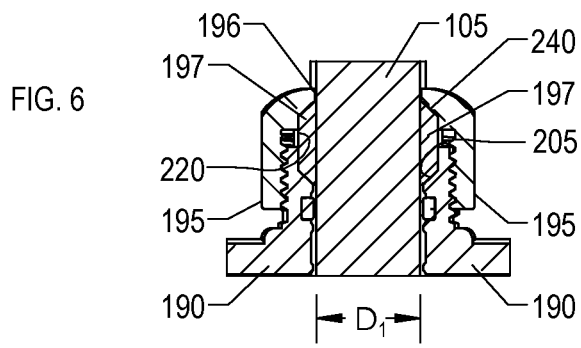
FIG. 6 is a front cross-sectional view of a connector box input power cord receiver for the electrical surge suppressor system of FIG. 1.
Figure 4:
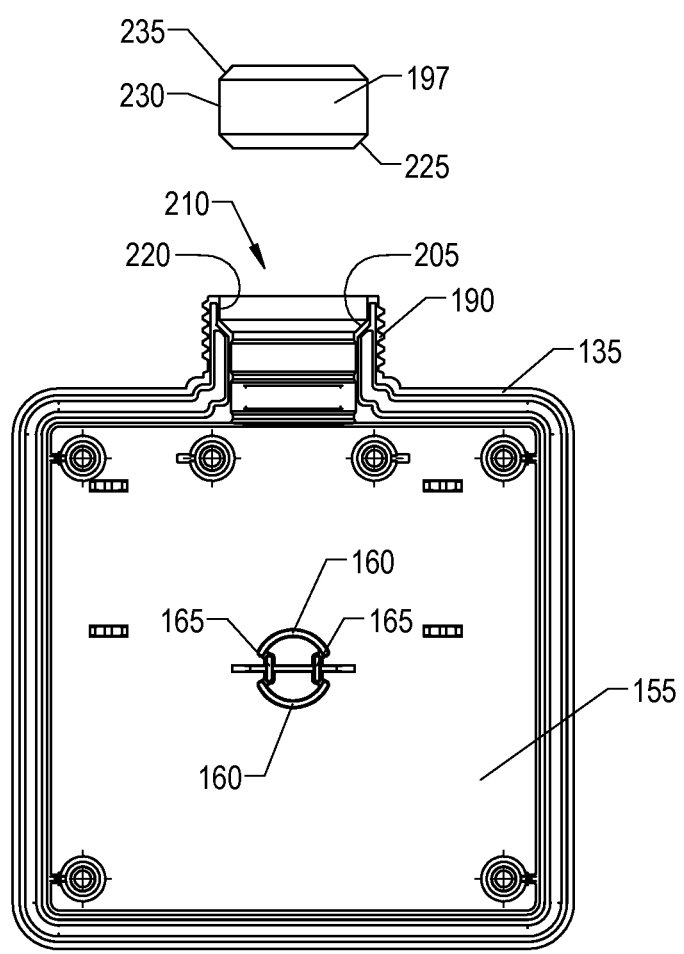
FIG. 4 is a front view of a connector box back section for use with the electrical surge suppressor systems of FIG. 1, 2, or 3.
Figure 9:
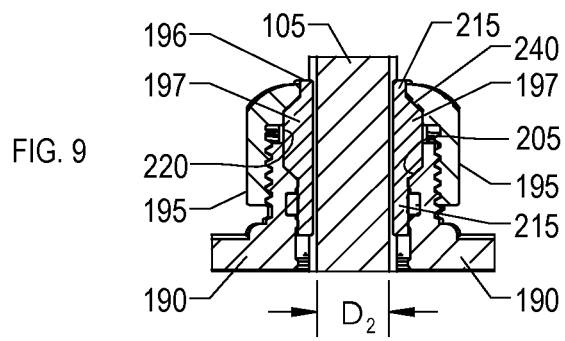
FIG. 9 is a front cross-sectional view of a connector box input power cord receiver for the electrical surge suppressor system of FIG. 2.
Figure 7:
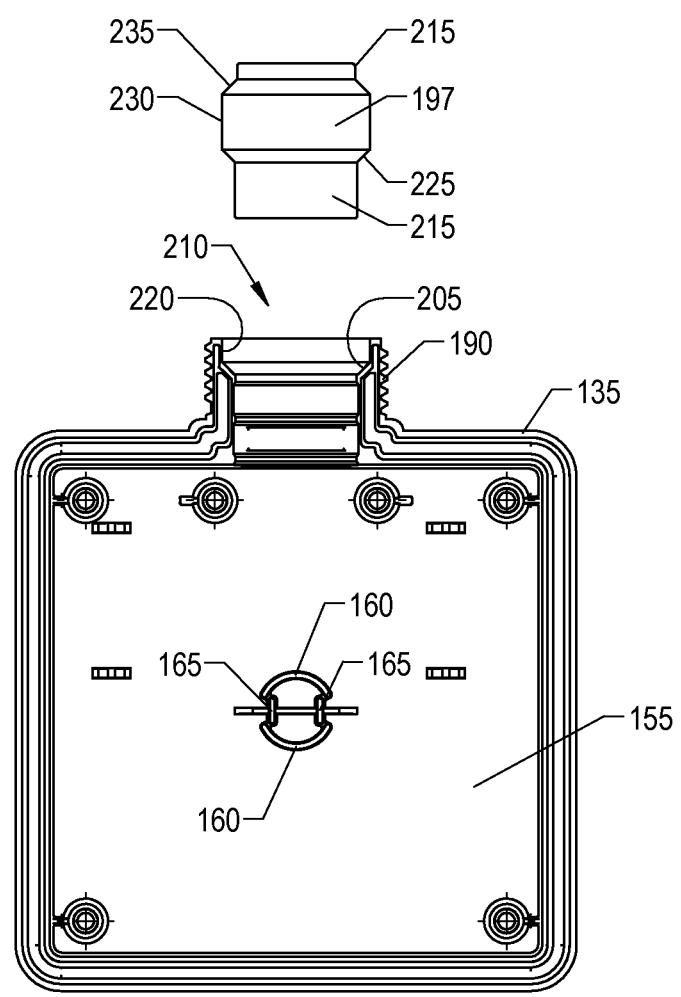
FIG. 7 is a front view of a connector box back section for use with the electrical surge suppressor systems of FIG. 1, 2, or 3.
Figure 10:
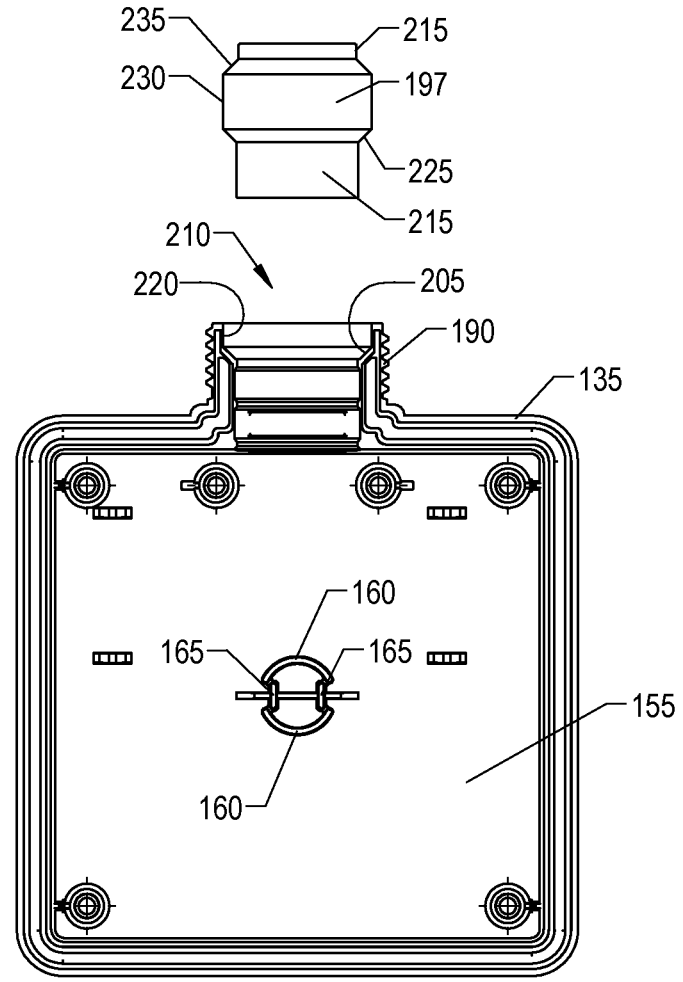
FIG. 10 is a front view of a connector box back section for use with the electrical surge suppressor systems of FIG. 1, 2, or 3.

Referring now to FIGS. 4 through 10, one such design feature comprises a standardized connector box input power cord receiver 190 having an input power cord opening 210 sized to accommodate the largest input power plug assembly 105. FIGS. 4, 7, and 10 each illustrate a standardized (i.e., essentially identical) connector box back section 135. The input power cord receiver 190 comprises a gasket first seating surface 205 and a gasket second seating surface 220. The gasket first and second seating surfaces 205, 220 may be disposed at an angle θ1 with respect to one another (see FIG. 13). This angle may be greater than 90 degrees, for example between about 110 degrees and 170 degrees. FIGS. 4 through 6, FIGS. 7 through 9, and FIGS. 10 through 12 each demonstrate how the same front and back sections 130, 135 may be used regardless of the specific input power plug assembly.

Figure 5:
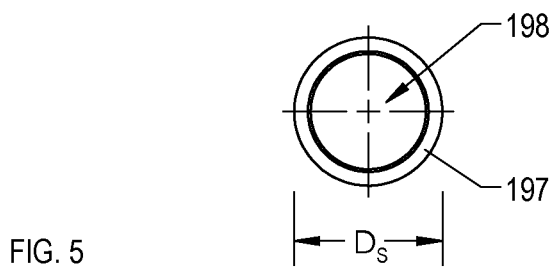
FIG. 5 is a front view and top view of a gasket for use with the electrical surge suppressor system of FIG. 1.
Figure 8:
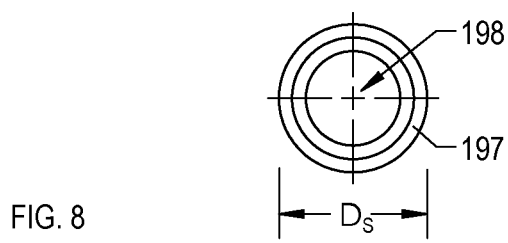
FIG. 8 is a front view and top view of a gasket for use with the electrical surge suppressor system of FIG. 2.
Figure 11:
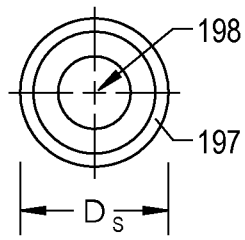
FIG. 11 is a front view and top view of a gasket for use with the electrical surge suppressor system of FIG. 3.

FIGS. 5, 8, and 11 illustrate that each gasket 197 has an outer diameter $D_s$ that is approximately the same as a diameter of the input power cord opening 210 as measured across the second gasket seating surface 220 such that the gasket 197 can be positioned in the input power cord opening 210. When the gasket 197 is positioned in the input power cord opening 210, a gasket first side surface 225 may be adjacent to the gasket first seating surface 205, and a gasket second side surface 230 may be adjacent to the gasket second seating surface 220. Additionally, each gasket 197 may comprise a clearance hole 198 with a diameter $D_1$, $D_2$, $D_3$ sized for an interference fit with the jacket 115 of the input power plug assembly 105.

It should be noted that in order to further standardize components of the electrical surge suppressor system 100, the power cord receiver locking nut 195 is typically the same for all embodiments. The locking nut 195 may comprise a clearance hole 196 to accommodate passing through the input power plug assembly. A diameter of the clearance hole 196 may be essentially the same as $D_s$.

Figure 12:
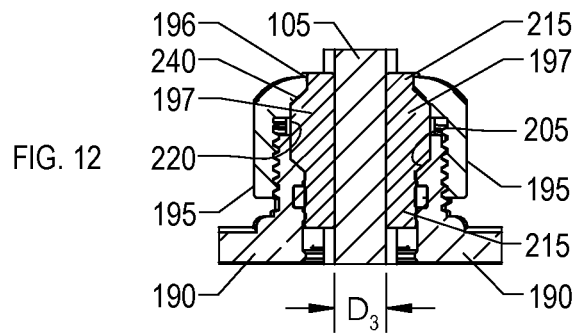
FIG. 12 is a front cross-sectional view of a connector box input power cord receiver for the electrical surge suppressor system of FIG. 3.

Referring now to FIGS. 6, 9, and 12, various embodiments of front cross-sectional views of the assembled input power cord receiver 190 are illustrated. As the locking nut 195 is screwed into place on the receiver 190, a locking nut gasket seating surface 240 may contact a third gasket side surface 235. As the locking nut 195 moves further downward, the gasket 197 may be urged downward until the gasket first side surface 225 makes contact with the gasket first seating surface 205. Because the gasket 197 is now essentially restrained from further downward movement by the gasket first seating surface 205, further downward movement of the locking nut 195 may cause the gasket 197 to expand radially due to the elastomeric properties of the gasket 197, causing the gasket second side surface 230 to make contact with the gasket second seating surface 220, as well as the input power cord jacket 115. The gasket 197 may now be in contact with at least four surfaces (gasket first and second seating surfaces 205, 220; locking nut gasket seating surface 240; and input power cord jacket 115) to form an effective environmental seal preventing water and dirt from entering the connection box assembly through the input power cord opening.

Figure 13:
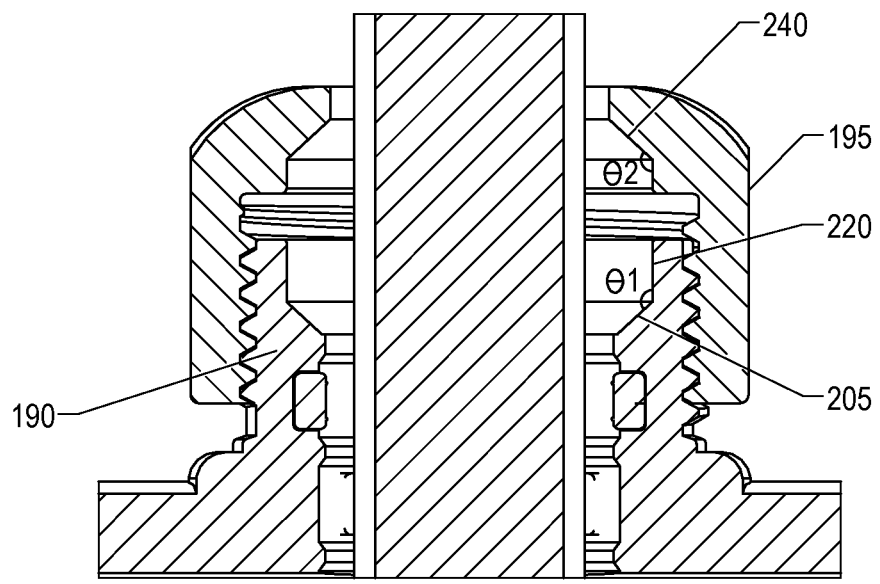
FIG. 13 is a front cross-sectional view of a detail of a connector box input power cord receiver for the electrical surge suppressor system of FIG. 2.
Figure 14:
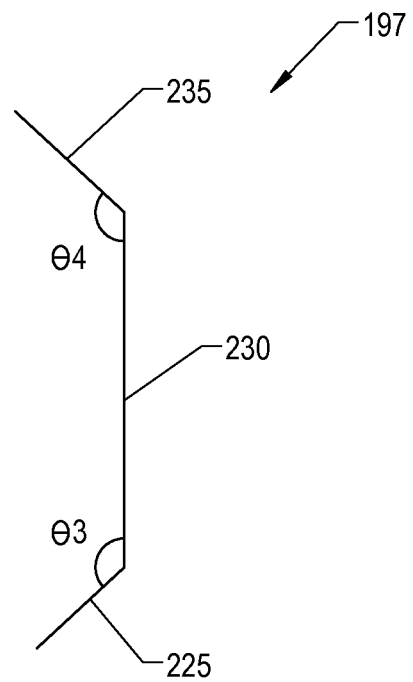
FIG. 14 is a schematic view of a detail of a gasket for use with the electrical surge suppressor systems of FIG. 1, 2, or 3.

The locking nut gasket seating surface 240 may be disposed at an angle θ2 relative to the gasket second seating surface 220 (see FIG. 13). This angle may be greater than 90 degrees, for example between about 110 degrees and 170 degrees. Similarly, each of the gasket first side surface 225 and the gasket third side surface 235 may be disposed at an angle relative to the gasket second side surface 230 (see FIG. 14). Generally, the angle θ3 between the gasket first and second side surfaces 225, 230 may be approximately the same as the angle θ1 between the gasket first seating surface 205 and the gasket second seating surface 220. The angle θ4 between the gasket second and third side surfaces 230, 235 may be approximately the same as the angle θ2 between the locking nut gasket seating surface 240 and the gasket second seating surface 220.

In FIGS. 7 through 9 and in FIGS. 10 through 12, the diameter $D_2$, $D_3$ of the input power plug assembly 105 may be substantially less than the diameter $D_s$ of the input power cord opening 210 and the locking nut clearance hole 196. In various embodiments, the gasket 197 may further comprise extension sleeves 215 to fill the gap between $D_2$ and $D_s$ and the gap between $D_3$ and $D_s$.

Figure 15:
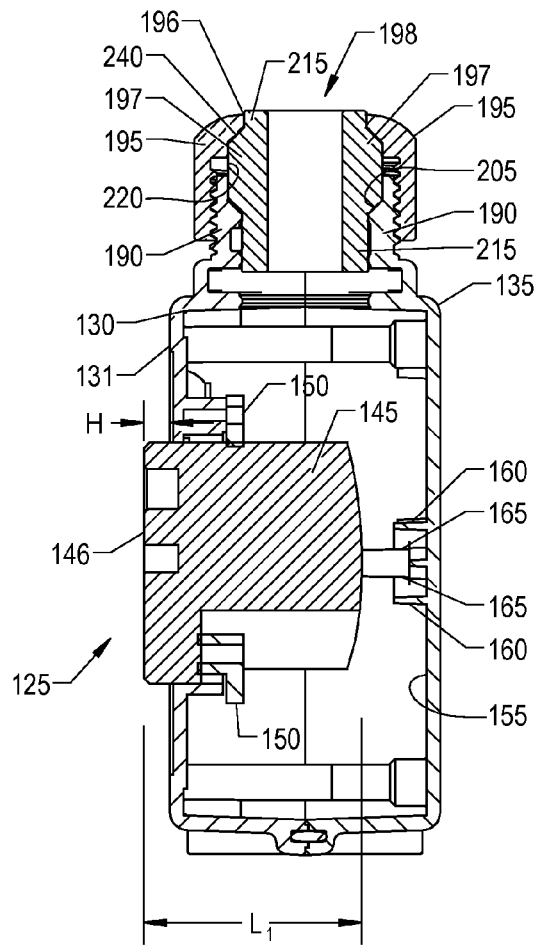
FIG. 15 is a side cross-sectional view of a connector box assembly for use with the electrical surge suppressor systems of FIG. 3.
Figure 16:
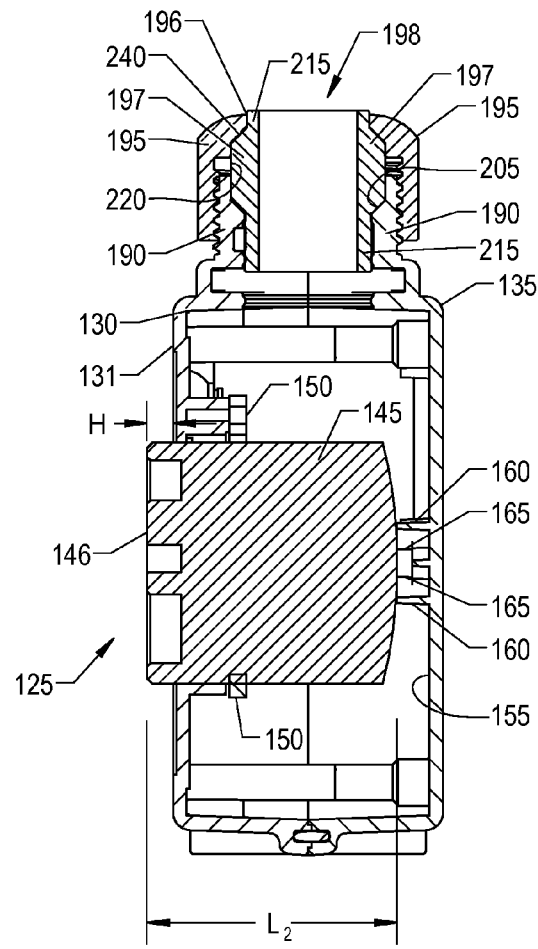
FIG. 16 is a side cross-sectional view of a connector box assembly for use with the electrical surge suppressor systems of FIG. 2.

Yet additional design features to standardize components of the electrical surge suppressor system 100 are illustrated in FIGS. 15 and 16. As discussed previously, a variety of different input electrical sources may be encountered. Each input electrical source may require a specific type of outlet female receptacle 145. Each of these receptacles 145 may have different physical dimensions, particularly length. However, despite the length of the receptacle 145, the position of the front face 146 of the receptacle 145 in relation to the connector box front section outer surface 131 (designated by H in FIGS. 15 and 16) may generally remain the same. In order to maintain the relative position of the front face 146 of the receptacle 145 with the outer surface 131 of the connector box front section 130, a plurality of positioning tabs 160, 165 may be coupled to a connector box back section inner surface 155. The positioning tabs 160, 165 may extend outward from the inner surface 155 such that at least a portion of the tabs 160, 165 contact the receptacle 145.

FIGS. 15 and 16 illustrate various embodiments in which the positioning tabs 160, 165 comprise first level positioning tabs 160 and second level positioning tabs 165. The second level positioning tabs 165 may extend further from the back section inner surface 155 than the first level positioning tabs. In FIG. 15, the length $L_1$ of the receptacle 145 requires the second level positioning tabs 165 to maintain the distance H between the front face 146 of the receptacle and the outer surface 131 of the connector box front section 130. In FIG. 16, the length $L_2$ of the receptacle 145 is greater than the length $L_1$ of the receptacle in FIG. 13. Thus, in FIG. 16, at least a portion of the second level tabs 165 have been removed and the first level tabs 160 contact the receptacle 145. FIGS. 15 and 16 illustrate embodiments comprising two levels of positioning tabs 160, 165. One skilled in the art will readily recognize that more or less than two levels of positioning tabs 160, 165 is within the scope of this disclosure.

The positioning tabs 160, 165 in various embodiments may be flexible such that the unused positioning tabs 160, 165 may be removed or positioned out of the way of the receptacle 145 by breaking, tearing, cutting, melting, slicing, bending or any other method known in the art. The positioning tabs 160, 165 may be formed integrally with the connector box back section 135 or may be coupled to the back section 135 by adhesive of any manner, screws or other connectors, interference fit, or any other coupling method known in the art.

Figure 17:
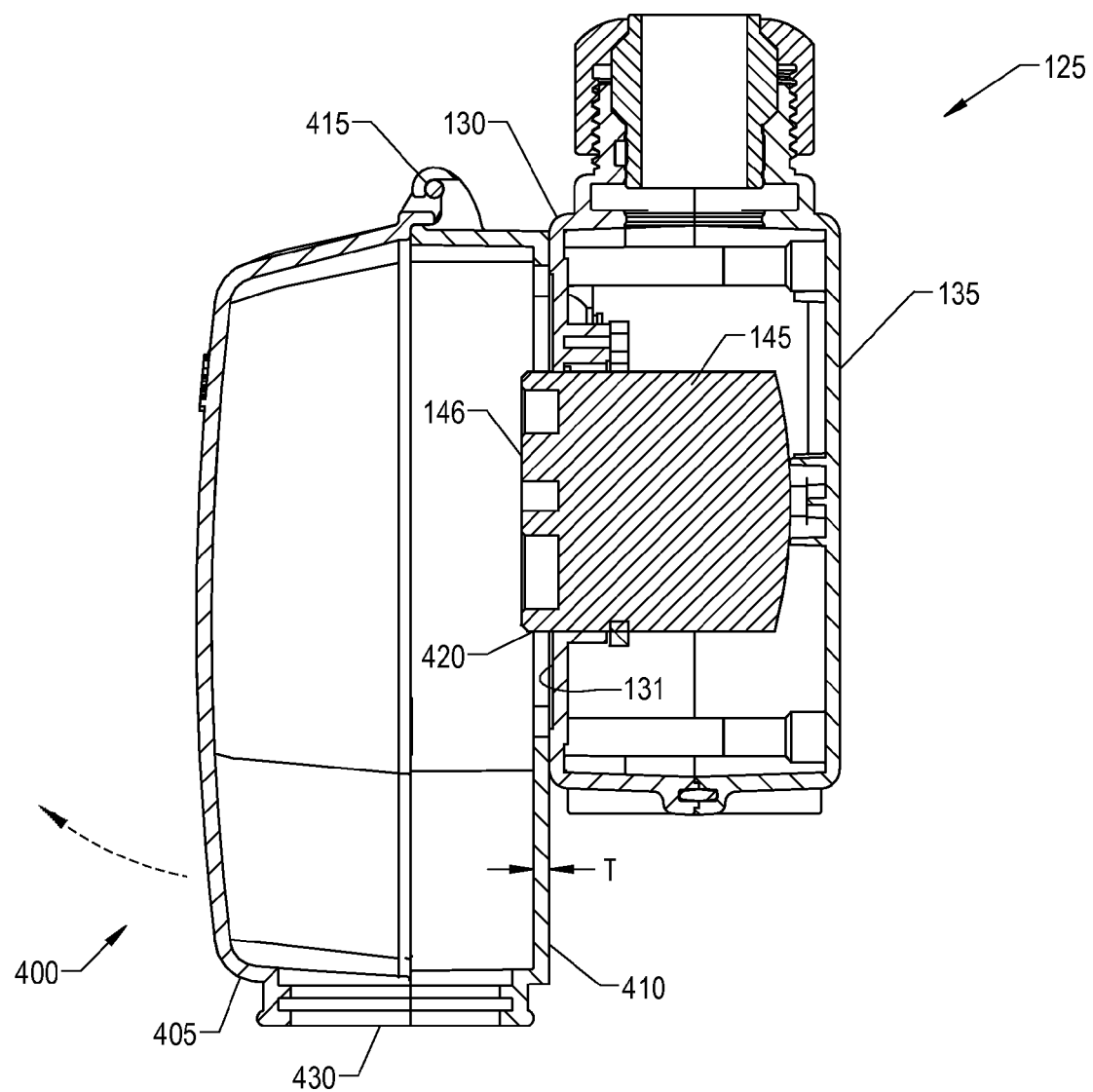
FIG. 17 is a side cross-sectional view of a connector box assembly with a cover for use with the electrical surge suppressor systems of FIG. 2.

FIG. 17 illustrates various embodiments of a receptacle cover 400 capable of being coupled to the outer surface 131 of the connector box front section 130. The cover 400 may comprise a back section 410 in contact with the connector box front section outer surface 131. The cover back section 410 may comprise a receiving opening 420 to receive the front face 146 of the receptacle 145. The receptacle cover 400 may further comprise a front section 405 pivotably coupled to the back section 410 by a hinge 415. The hinge 415 may allow the front section 405 to swing upward in the direction of the broken arrow in FIG. 15.

The receptacle cover 400 may be fabricated of a plastic material such as polycarbonate, acrylic, polypropylene, polyethylene, and the like. The cover back section 410 may have a thickness T that is equal to or less than the height H that the front face 146 of the receptacle 145 is positioned above the outer surface 131 of the connector box front section 130. This thickness allows the front face 146 of the receptacle 145 to be easily accessible for plugging and unplugging an electrical extension cord.

The receptacle cover back section 410 may further comprise a resealable passthrough 430. The passthrough 430 may allow an electrical cord that is plugged into the receptacle 145 to be routed out of the cover while generally allowing the cover to remain sealed. In various embodiments, the passthrough may comprise a plurality of closely spaced thin rubber strips (or other elastomeric material) that allow the cord to pass between the strips but are thin and flexible enough to generally conform around the cord and at partially reseal the opening.

As used herein, the terms "having", "containing", "including", "comprising", and the like are open ended terms that indicate the presence of stated elements or features, but do not preclude additional elements or features. The articles "a", "an" and "the" are intended to include the plural as well as the singular, unless the context clearly indicates otherwise.

The present invention may be carried out in other specific ways than those herein set forth without departing from the scope and essential characteristics of the invention. The present embodiments are, therefore, to be considered in all respects as illustrative and not restrictive, and all changes coming within the meaning and equivalency range of the appended claims are intended to be embraced therein.

The invention claimed is:

1. An electrical connection box, comprising:
a front section and a back section forming a hollow space therebetween, the front section having an outer surface and a mounting hole in the outer surface, and the back section having an inner surface;
an electrical connection receptacle having a front face and a length, the electrical connection receptacle positioned within the mounting hole;
a portion of the electrical connection receptacle extending into the hollow space forming a gap between the electrical connection receptacle and the inner surface of the back section;
a portion of the electrical connection receptacle extending out of the mounting hole such that the front face of the electrical connection receptacle is positioned a predetermined distance above the outer surface of the front section;

a first set of positioning tabs extending outward from the inner surface of the back section across the gap and contacting the electrical connection receptacle thereby maintaining the predetermined distance when the electrical connection receptacle has a first length; and a second set of positioning tabs having a length greater than that of the first set of positioning tabs and extending outward from the inner surface of the back section across the gap and contacting the electrical connection receptacle thereby maintaining the predetermined distance when the electrical connection receptacle has a second length less than the first length.

2. The electrical connection box of claim 1, wherein the second set of positioning tabs are removable when the electrical connection receptacle has a length equal to the first length.

3. The electrical connection box of claim 1, wherein each of the first and second sets of positioning tabs may comprise one positioning tab or multiple positioning tabs.

4. The electrical connection box of claim 1, wherein a distance that the first set of positioning tabs extends outward from the inner surface of the back section is less than a distance that the second set of positioning tabs extends outward from the inner surface of the back section.

5. The electrical connection box of claim 1, further comprising a third set of positioning tabs.

6. The electrical connection box of claim 5, wherein a distance that the first set of positioning tabs extends outward from the inner surface of the back section is less than a distance that the second set of positioning tabs extends outward from the inner surface of the back section, and the distance that the second set of positioning tabs extends outward from the inner surface of the back section is less than a distance that the third set of positioning tabs extends outward from the inner surface of the back section.

7. An electrical connection box, comprising:
a power cord receiver extending outward from an electrical connection box and forming an opening into the electrical connection box, the opening further comprising first and second seating surfaces;
a power cord positioned within the power cord receiver and extending through the opening into the electrical connection box;
a locking nut having a third seating surface, the locking nut engaging the power cord receiver; and
a gasket disposed about the power cord and positioned at least partially within the opening, the gasket comprising at least three interconnected surfaces, at least two of the interconnected surfaces in contact with the power cord receiver and at least one of the interconnected surfaces in contact with the locking nut, the gasket further comprising a fourth surface in contact with the power cord;
wherein the gasket further comprises one or more extension sleeves to fill gaps within the opening when a diameter of the power cord is less than a diameter of the opening.

8. The electrical connection box of claim 7, wherein the third seating surface contacts the at least one of the interconnected surfaces when the locking nut engages the power cord receiver, thereby urging the other two of the three interconnected surfaces into contact with the first and second seating surfaces.

9. The electrical connection box of claim 7, wherein the three interconnected surfaces comprise at least a portion of an outer surface of the gasket and the fourth surface comprises at least a portion of an inner surface of the gasket.

10. The electrical connection box of claim 7, wherein two of the at least three interconnected surfaces are each oriented at an angle relative to the third of the at least three interconnected surfaces, each of the angles ranging from about 110 degrees to about 170 degrees.

11. An electrical connection box, comprising:
a power cord receiver extending outward from an electrical connection box and forming an opening into the electrical connection box, the opening further comprising first and second seating surfaces;
a power cord positioned within the power cord receiver and extending through the opening into the electrical connection box;
a gasket disposed about the power cord and positioned at least partially within the opening, the gasket having first, second, and third side surfaces, wherein the first side surface and the second side surface are oriented relative to one another by a first angle, and the third side surface and the second side surface are oriented relative to one another by a second angle; and
a locking nut having a third seating surface, the locking nut engaging the power cord receiver;
wherein the third seating surface contacts the third side surface of the gasket when the locking nut engages the power cord receiver, thereby urging the first side surface of the gasket into contact with the first seating surface and urging the second side surface of the gasket into contact with the second seating surface;
wherein the gasket further comprises one or more extension sleeves to fill gaps within the opening when a diameter of the power cord is less than a diameter of the opening.

12. The electrical connection box of claim 11, wherein the gasket contacts the power cord when the locking nut engages the power cord receiver.

13. The electrical connection box of claim 11, wherein the first angle ranges from about 110 degrees to about 170 degrees.

14. The electrical connection box of claim 11, wherein the second angle ranges from about 110 degrees to about 170 degrees.

15. The electrical connection box of claim 11, wherein the first and second angles are essentially the same angle.

16. The electrical connection box of claim 11, wherein the first and second angles are different angles.

17. The electrical connection box of claim 11, wherein the first seating surface and the second seating surface are oriented relative to one another at a third angle approximately equal to the first angle.

18. The electrical connection box of claim 11, wherein the third seating surface and the second seating surface are oriented relative to one another at a fourth angle approximately equal to the second angle when the locking nut engages the power cord receiver.

* * * * *